Figure 6:
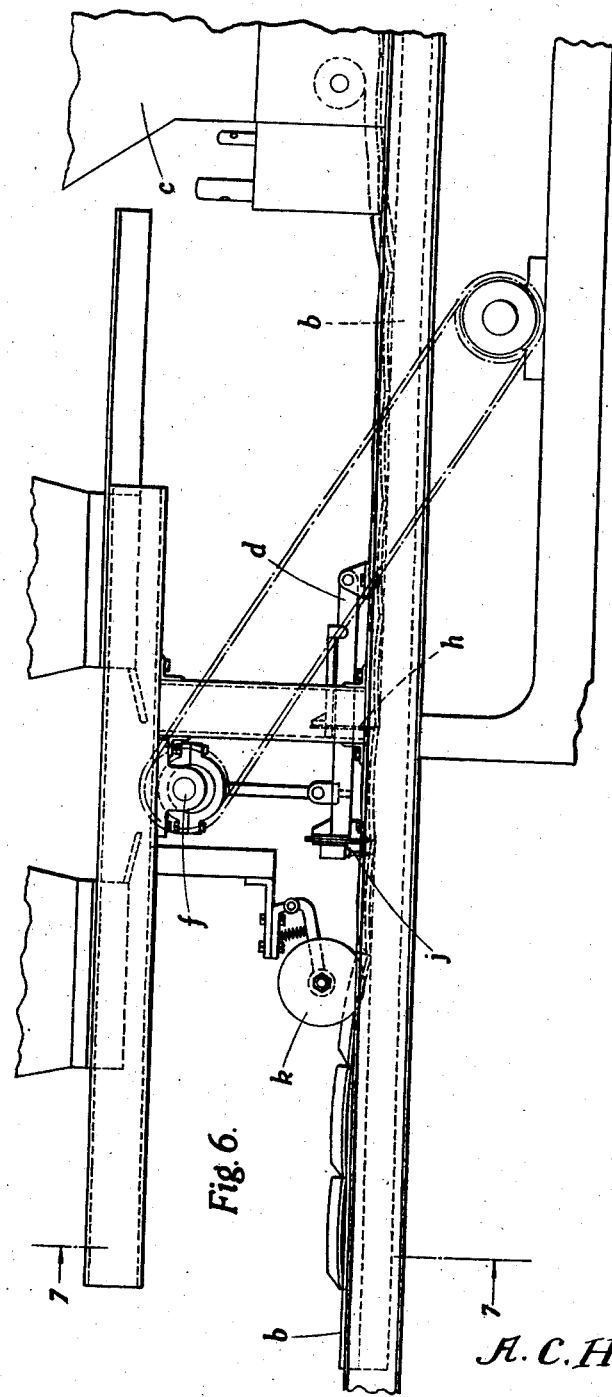

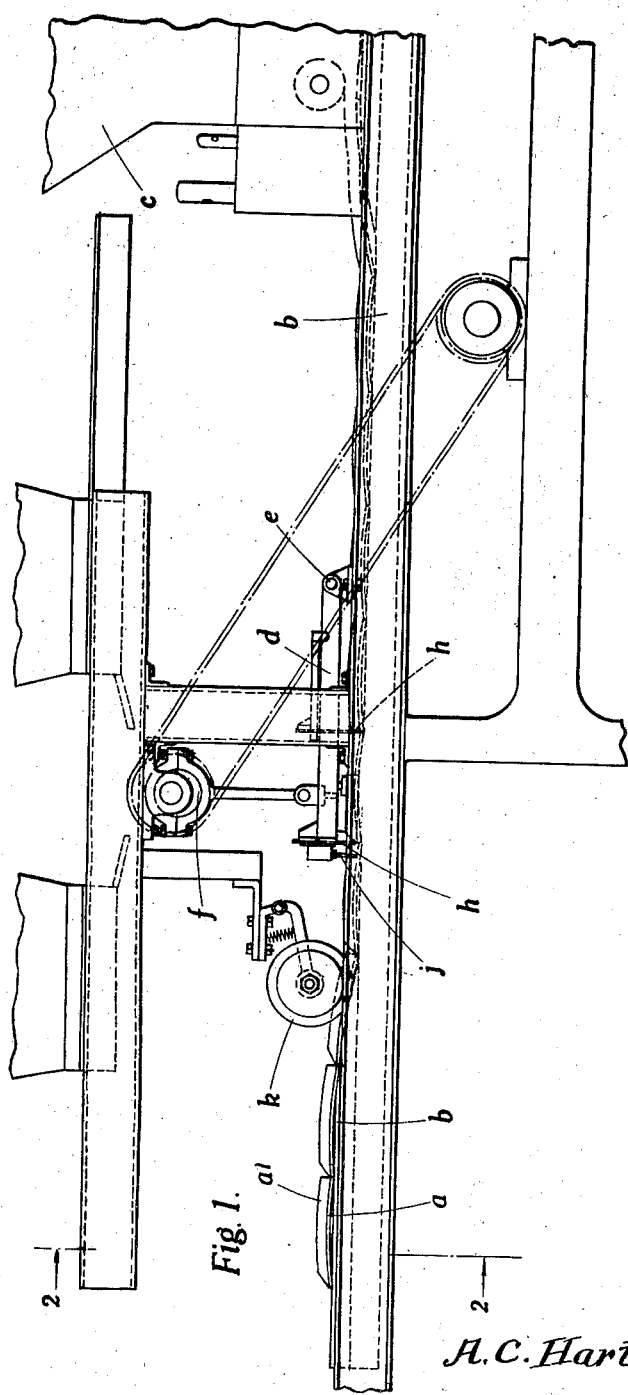

Oct. 7, 1941.  A. C. HARTLEY  2,258,553
METHOD AND MACHINE FOR MAKING ROOFING TILES
Filed Oct. 19, 1940   5 Sheets-Sheet 2
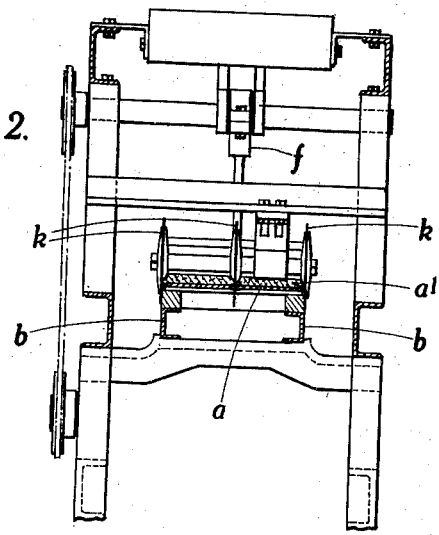
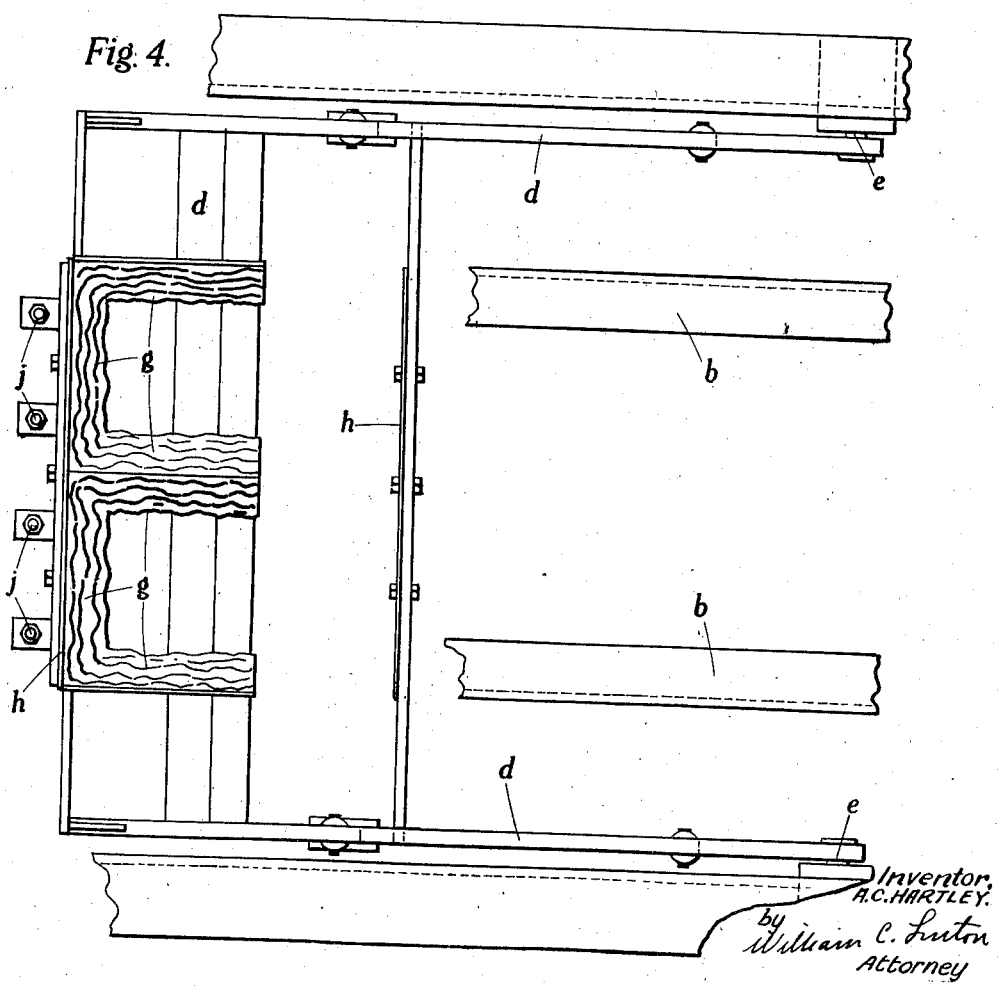
Inventor,
A.C. HARTLEY.
by William C. Luton
Attorney Oct. 7, 1941.  A. C. HARTLEY  2,258,553
METHOD AND MACHINE FOR MAKING ROOFING TILES
Filed Oct. 19, 1940  5 Sheets-Sheet 3
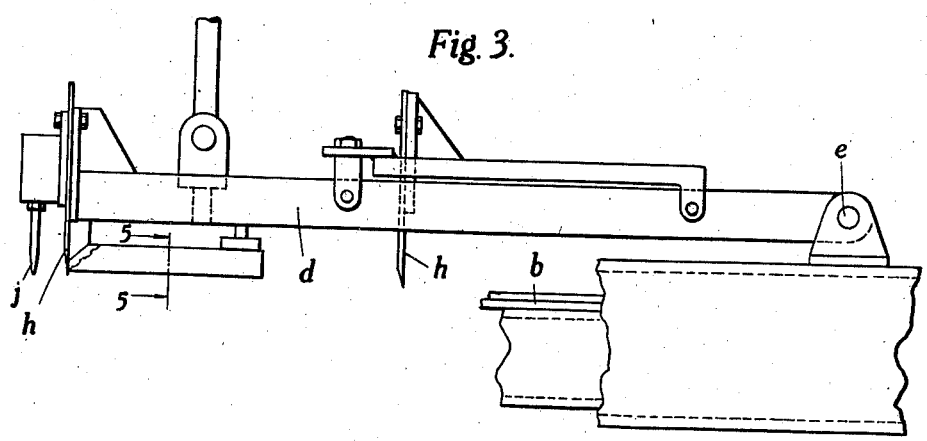
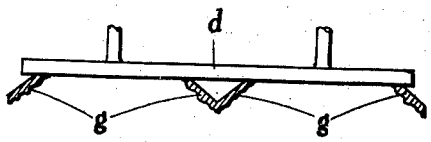
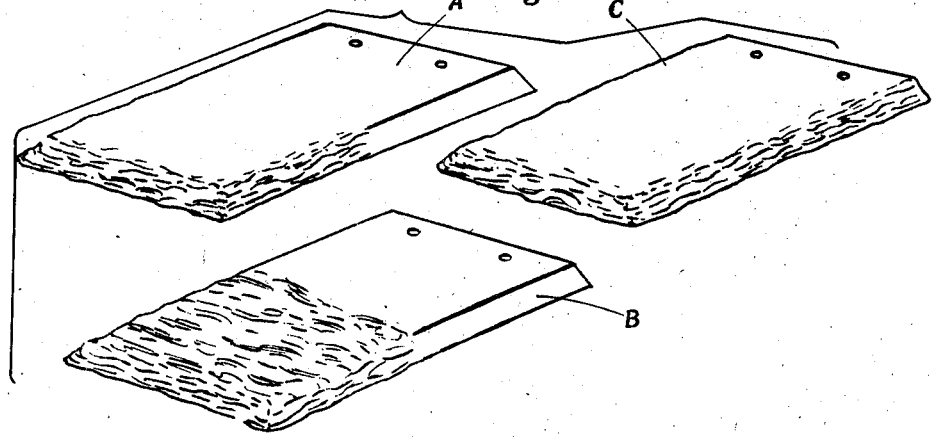
Inventor
A. C. Hartley
by
William C. Linton.
Attorney

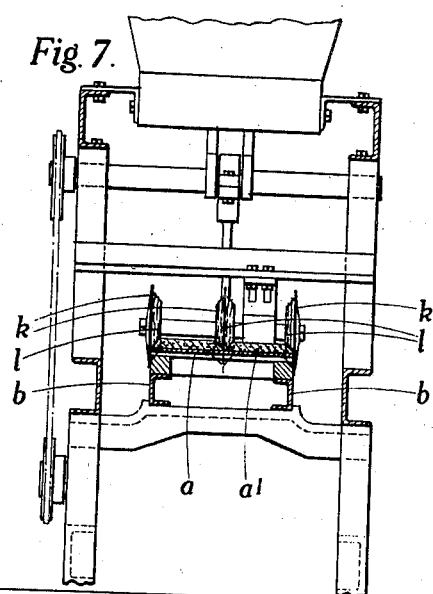
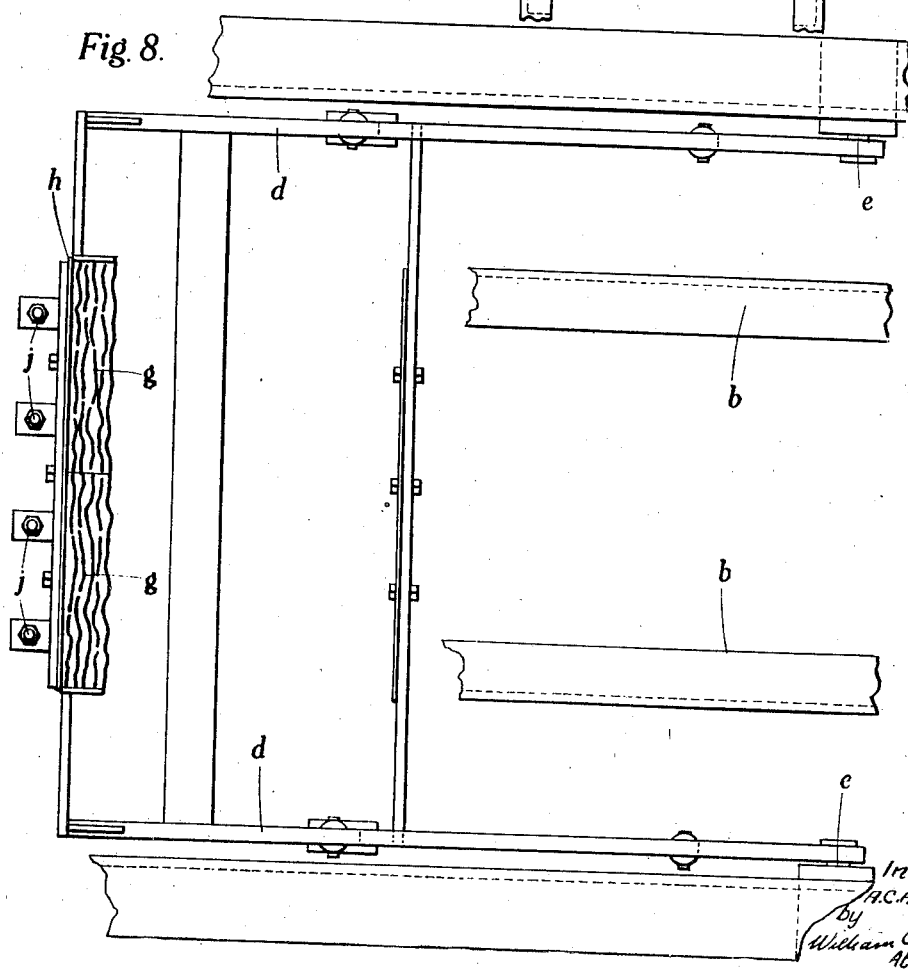

Patented Oct. 7, 1941

2,258,553

UNITED STATES PATENT OFFICE 2,258,553

METHOD AND MACHINE FOR MAKING ROOFING TILES

Alfred Claude Hartley, Farnborough, England

Application October 19, 1940, Serial No. 361,961
In Great Britain July 12, 1939

6 Claims. (Cl. 25—43)

This invention relates to machines for making roofing tiles and has for its objects to provide an improved method of and apparatus for manufacturing tiles of concrete, and other plastic material, which simulate the hand-made roofing slates known as Welsh Peggy or Cotswold slates.

To this end, roofing tiles made of concrete or other plastic material are formed mechanically with one or more jagged or irregular edges. If desired, the said jagged edge or edges may be chamfered, the surface thereof being formed with irregular patterns or indentations. Also, the whole, or part of, the upper surface of the tiles, apart from the chamfered edges, may be formed with irregular patterns or indentations.

The means for forming the said jagged or irregular edges may consist of impression plates and/or rollers operating in conjunction with the usual cutting knives employed in a continuously-running tile-making machine.

For example, in such a machine where the tiles in their plastic state travel through on pallets separately or arranged side by side, the usual transverse reciprocating knife may be provided with an impression plate or plates diverging upwardly from just above the cutting edge. The said impression plates may be embossed or engraved with irregular patterns.

When the said knife descends to cut the plastic, the impression plates press on to the edges of the tiles and form chamfers or bevels and also cause the plastic to assume a jagged or irregular edge after having been cut by the knife. The embossments or engravings form patterns on the said chamfers or bevels.

When rotary knives are employed to cut the plastic longitudinally and also to trim the outside edges of the tiles, each of said rotary knives may be provided with a bevelled impression roller disposed at one side, or one at each side, thereof, said bevelled rollers being embossed or engraved and acting in a manner similar to the impression plates above-mentioned. The said rollers may be of any desired width and shape so that portions or the whole of the face of the tile may be patterned.

The invention will now be described with reference to the accompanying drawings in which Figure 1 is a side elevation, shewn somewhat diagrammatically, of a portion of one form of tile-making machine constructed in accordance with this invention; Figure 2 is an end elevation looking in the direction of the arrows 2—2 of Figure 1; Figure 3 is a side elevation of the press seen in Figure 1 but drawn to a larger scale; Figure 4 is an underside plan view of the press shewn in Figure 3; Figure 5 is a section taken on the line 5—5 of Figure 3; Figures 6, 7 and 8 are similar views to Figures 1, 2 and 4 respectively of a modified construction of machine, and Figure 9 shews three different tiles produced by the machines.

Referring first to Figures 1 to 5 inclusive, the general lay-out of the machine is of known construction. The pallets $a$ are fed from a magazine (not shewn) and travel on tracks $b$, $b$, along the whole length of the machine. The said pallets, during their travel, abut one against the other, and each pallet, in this particular machine, is adapted to make two tiles, arranged side by side, as seen in Figure 2. Each pallet, after it has received its quantity of plug or plastic mass $a'$ from the hopper $c$ for making the tile, is travelled along the track $b$ until it passes under a press $d$. This press is pivoted at $e$ to a stationary part of the machine and is adapted to be reciprocated by means of the eccentric cam $f$. The underside of the said press, as clearly seen in Figure 4, is formed with bevelled surfaces or impression plates $g$, $g$, $g$, with irregular patterns or indentations. When the press descends on to the pug or plastic mass these bevelled surfaces or plates press on to the edges of the tiles and form chamfers or bevels and also cause the plastic to assume a somewhat jagged or irregular edge.

Also provided on the underside of the said press are two transverse separating knives or guillotines $h$, $h$, and nail-hole punches $j$, $j$. As the press is lowered, these knives $h$, $h$, cut off the pug or plastic mass into the desired lengths of tile and the nail-hole punches $j$ form the usual holes in the tile.

Figure 9A shews a tile formed with the jagged or irregular ends or sides. It will be noted from Figures 4 and 9A that the jagged surfaces do not extend along the entire length of the sides of the tile, but of course the whole length can be jagged if desired. Further, the whole or part of the surface of the tiles, apart from the chamfered edges, may be formed with irregular patterns, for example as shown in Figure 9B. This can be effected by the provision of indented plates in the spaces bounded by the impression plates $g$ (see Figure 4).

After the pallet has traveled forward from the press $d$ it engages circular cutting knives $k$, $k$, $k$, which cut the plastic mass into two longitudinally to form two tiles and also to trim the outer edges of the tiles. The pallets, with the tiles in their plastic state, can now be removed from the machine and dried.

Referring now to Figures 6-8 inclusive, these figures shew a modification of the machine illustrated in Figures 1 to 5 inclusive. This modification is the substitution of bevelled and indented rollers for the bevelled surface or impression plates g, g, to form the jagged sides of the tiles.

The machine illustrated, apart from the press and circular cutting knives, is similar to that described above, and the same reference letters for like parts will be used in all the figures.

Referring to the press d, the difference here is that there is only one bevelled surface or impression plate g for the end of the tile. To form the jagged sides of the tiles, as stated above, the circular cutting knives k, k, are provided with bevelled impression rollers l, l, l (see Figure 7); these rollers indent the whole length of the edges as seen in Figure 9C.

Intead of being provided on the cutting knives k, k, the rollers l, l, may be mounted separately therefrom. The said bevelled impression rollers may be built up from a plurality of discs so that the patterns or impressions may be varied.

What I claim is:

1. The method of manufacturing tiles from plastic materials, simulating the hand-made roofing slates known as Welsh Peggy or Cotswold slate in a progressive manner which consists in extruding the plastic material upon the pallets of a carrier in the form of a slab of uniform cross section, cutting said slab of material transversely to form two separate sections of the desired length, punching nail-holes through said sections of plastic material, simultaneously chamfering said sections, whereby jagged or irregular edges and surfaces will be formed, cutting said sections of plastic material into tile sections and finally trimming the edges of said tile sections of plastic material with mechanical means as the same are being conveyed by said carrier.

2. A machine for making roofing tiles comprising a supporting frame, an endless conveyor mounted upon said frame, pallets mounted upon said conveyor, means for supplying plastic material to each pallet, a press, a cutting member carried by said press, an impression plate carried by said press, means for transmitting motion to said press whereby the plastic material upon each pallet as it passes below the same will be simultaneously cut into a tile and impressions formed thereupon from said impression plate and means for trimming the edges of the so formed tile.

3. A machine for making roofing tiles comprising a supporting frame, an endless conveyor mounted upon said frame, pallets mounted upon said conveyor, means for supplying plastic material to each pallet, a press, cutting blades mounted upon said press for cutting the plastic material upon each pallet into sections, nail-hole punch carried by said press for punching nail-holes in said sections of plastic material, impression plates carried by said press, means for transmitting motion to said press whereby impressions will be made upon each section simultaneously with cutting the plastic material into sections, cutting knives mounted upon said supporting frame for cutting said sections of plastic material into tile sections and trimming the edges of the so formed tile sections.

4. A cutting and impression press for tile making machines comoprising a frame, means for pivotally supporting one end of said frame, a cutting blade mounted upon said frame and extending transversely thereof, nail-hole punches mounted upon the opposite end of said frame, an impression plate detachably mounted upon said frame and said impression plate being arranged between said cutting blade and said nail-hole punches.

5. A machine for making roofing tile comprising a carrier, means for feeding plastic material to said carrier, a pivotally mounted press, transversely extending separating knives carried by said press, nail-hole punches carried by said press, impression plates removably supported by said press, means for oscillating said press whereby the plastic material upon said carrier will be simultaneously cut into sections, nail-holes punched therein, a pattern impressed thereon, means for cutting said sections longitudinally to form tile sections and means for trimming the edges of said tile sections.

6. A tile making machine comprising a supporting frame, an endless carrier mounted upon said frame, removable pallets mounted upon said carrier, means for feeding a slab of plastic material to each pallet, a press, means for pivotally connecting one end of said press to said frame, nail-hole punches and cutting blades carried by said press, impression plates detachably mounted upon said press, means for causing said press to be swung upon its pivoted connection whereby each slab of plastic material as it passes below the same will be cut into sections, nail-holes formed into each section and impressions formed thereupon, rotary cutting blades mounted upon said supporting frame for cutting said sections of plastic material into tile sections and trimming the edges of the so formed tile sections and impression discs detachably connected to said rotary cutting blades.

ALFRED CLAUDE HARTLEY.